April 20, 1965     V. J. CARPENTER     3,179,002

PROJECTOR SYSTEM

Filed Dec. 15, 1961     2 Sheets-Sheet 1

*INVENTOR.*
VANCE J. CARPENTER

BY
ATTORNEYS

April 20, 1965  V. J. CARPENTER  3,179,002
PROJECTOR SYSTEM

Filed Dec. 15, 1961  2 Sheets-Sheet 2

*INVENTOR.*
VANCE J. CARPENTER
BY
ATTORNEYS

United States Patent Office

3,179,002
Patented Apr. 20, 1965

3,179,002
PROJECTOR SYSTEM
Vance J. Carpenter, Rochester, N.Y., assignor to Bausch & Lomb Incorporated, Rochester, N.Y., a corporation of New York
Filed Dec. 15, 1961, Ser. No. 159,515
6 Claims. (Cl. 88—24)

This invention relates to a projecting system and more particularly to a synchronized sequence of projections of elemental images reflected on a viewing screen to form a composite picture.

Visual training through the use of projected pictures on a viewing screen provides a valuable aid to education. The device as illustrated provides a means of projecting a plurality of images on a single image receiving point which are sequentially reflected to form a composite picture on a viewing screen. This type of a system adapts itself particularly well in providing movements of various elements forming the composite picture. The movement of each of the elemental components of the composite picture can be controlled relative to the general background by individual projecting means. This system may be used to change the picture of terrain on a map, and simulate a changing scene or movement of objects relative to a background scene.

It is an object of this invention to project a plurality of images on a rotating mirror which reflects the images in a synchronized sequence to a point of visual observation.

It is another object of this invention to project a plurality of elemental images on a rotating mirror, the images of which are converged on a center portion of the mirror coincidental with the rotational axis of the mirror and sequentially reflected to form a composite picture on a viewing screen.

It is a further object of this invention to simultaneously project at least two elemental images on a rotating mirror for sequential reflection on a viewing screen to form a composite picture for visual observation.

The objects of this invention are accomplished through a projection of a plurality of individual images on a rotating mirror. The rotating mirror is rotating at a rate sufficient to reflect the elemental images simulating a composite picture on a viewing screen. The images projected on the screen form a momentary image of the elemental images at a sufficiently rapid rate to appear to be continuous due to the persistence of vision. The multiplicity of the projectors forming several different images on the screen appear to form a single composite image. The elemental images received on the viewing screen may be shifted to simulate movement of various objects included in the composite picture.

A control system is devised and located centrally to provide a means for controlling the movement of each of the elements in the composite picture. Because the axis of the rotating mirror is the only spatially stationary portion of the mirror, those portions of the image transversely displaced from this axis are somewhat blurred. The blurred portions are at the points most remote from the rotating axis of the mirror. Accordingly, an anamorphic optical element may be positioned in the optical system of the primary projector and also the secondary projector. The anamorphic optical element in the primary projector optical system converges the image substantially on the rotating axis of the mirror. This distorts the image to reduce the maximum dimension of the image transverse to the axis of the rotating mirror. A second anamorphic optical element is disposed between the mirror and the secondary projecting optical system. The second anamorphic optical element removes the distortion as the image is transmitted through the secondary optical projecting system which projects the image on the viewing screen.

An alternate method of compensating for this defocusing effect exists. The apparent defocusing of the final image results from the fact that there is an apparent change in the image plane during the time the beam from the projector is sweeping across the entrance pupil of the final projection lens. The magnitude of this change is proportioned to the distance of the edge of the image from the axis of rotation, and the above technique restricts this distance to a suitably small value. The second means of compensation consists of restricting the aperture of the projection lenses in a plane parallel to the axis of the mirror rotation. This then restricts the time that the image is projected by the final lens and thereby reduces the apparent shift of the image plane during the period of projection. Both techniques work equally well, and the choice of which to use is determined by the requirements of the overall system.

Other possible configurations of projectors and mirrors exist which will perform the required function of projecting an image onto a mirror and re-directing this through a second projection lens. One such possible configuration consists of having the projectors arrayed in a circle around the final projection lens with the images directed to a point on the optical axis of the final projection lens. At this point a nutating mirror is positioned to sequentially redirect images from successive projectors into the final projection lens. This and other configurations forming an image at a rotating mirror which re-directs the image into another projection lens are considered within the scope of this disclosure.

The following figures illustrate the preferred version of the projection system. Various modifications incorporating the spirit of the invention are considered to be within the scope of this invention of which the preferred version is illustrated and described.

Figure 1:
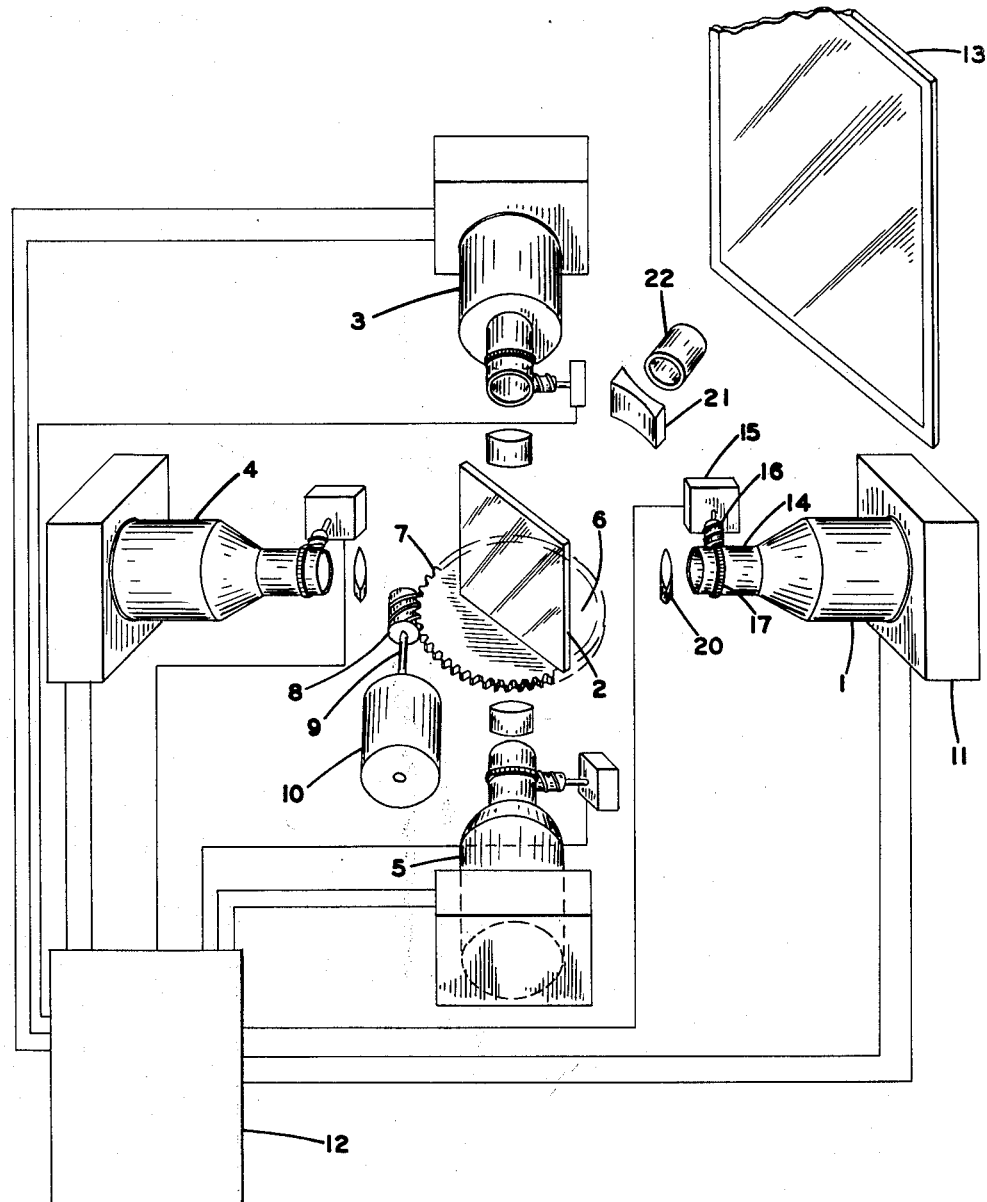
FIG. 1 is a schematic diagram of the overall projecting system.
Figure 3:
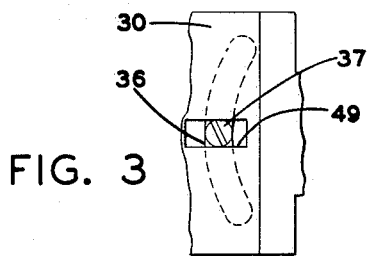
FIG. 3 is a fragmentary view illustrating a cammed slot on the barrel of the optical system as viewed in the direction of arrow 3.

Referring to FIG. 1 a plurality of primary projectors are illustrated with each one angularly spaced about the axis of rotation of the mirror 2. The optical axis of each of the primary projectors 1, 3, 4 and 5 is normal to the axis of rotation of the mirror 2. The mirror 2 is mounted on a rotating table 6 which is formed with the gear teeth 7 on its outer periphery which meshes with the worm gear 8. The worm gear 8 is connected through the shaft 9 to the motor 10. The speed of rotation of the mirror 2 is a predetermined speed governed by the speed of the motor 10 and comparable to projection speeds in the conventional motion picture projector.

Each of the plurality of primary projectors 1, 3, 4 and 5 is mounted on a control box 11. The control box 11 shifts the optical axis of the projector 1 in an up and down direction or a left and right direction in response to the input signal from a central control table 12. In this manner the axis of the projector is shifted relative to the reflecting surface of the mirror 2. The elemental image shifts its position on the reflecting mirror 2 and accordingly shifts its position on the viewing screen 13.

Each of the projectors has a similar control box which is centrally controlled through the control table 12 located adjacent to the operator of the projecting system. The central controlled table 12 as described in the preceding paragraph provides for the moving of the elemental images relative to the viewing screen to simulate the movement of the elemental component through the composite picture. A further control is incorporated in the optical system 14 of each of the projectors. The optical system 14 is mounted on the projector 1. A motor 15 with a drive shaft and worm gear 16 is connected to a ring gear 17 which operates a variable magnification of the optical system of the projector 1. The motor 15 for varying the magnification of optical system 14 is also connected to the central control table 12 to provide a convenient central means of operation for each of the lens systems in the plurality of primary projectors.

Figure 2:
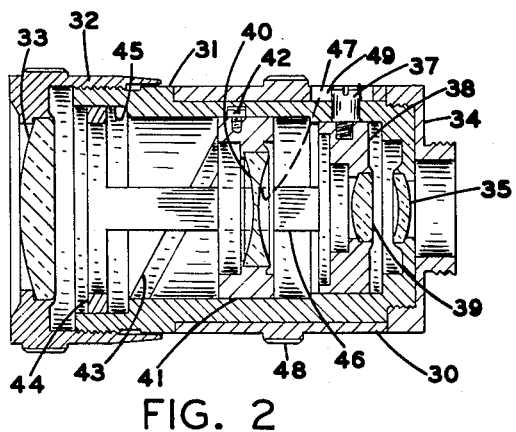
FIG. 2 is a cross section view of a variable magnification optical system which may be used in each of the primary projectors.

The variable magnification is illustrated in detail in FIG. 2 and includes an optical system which may be called a zoom system to provide a rapid change in magnification yet maintaining the focal plane at a substantially constant distance from each other regardless of magnification. The variable magnification system provides a means to simulate movement of each of the elemental images forming elemental images in the composite picture to move to a near or far distance in the composite picture. In other words, the magnification controls the size of the object and accordingly simulates movement to and from the point of visual observation of the viewing screen.

The overall system provides for a movement of each of the objects vertically or horizontally as well as forward and rearward in the composite picture formed in the viewing screen.

A further refinement is included in the schematic diagram of FIG. 1 which provides for a more accurate focusing of each of the images on the reflecting mirror. A positive anamorphic lens 20 is interposed between the lens system 14 and the rotating mirror 2. The anamorphic lens 20 converges the image on the surface of the mirror proximating the rotating axis of the mirror. The image projected onto the mirror is of course distorted as it is projected onto the mirror.

As previously pointed out the reflecting surface of the mirror is not completely in focus with the projected image from the primary projector 1. Theoretically, the only surface completely in focus is the vertical line on a reflecting surface of the mirror 2 coincidental with the rotating axis of the mirror. By converging the image on the reflecting surface of the mirror at a point adjacent the rotating axis a greater portion of the image is more nearly in focus.

The image formed on the rotating mirror and reflected onto the viewing screen is transmitted through a second anamorphic lens which is used to rectify the image as it is projected through the second anamorphic lens 21. The second anamorphic lens 21 rectifies the image prior to passing through the secondary projecting optical system 22. The secondary projecting lens system 22 sequentially projects the images from the mirror onto the viewing screen 13. The sequential projection of the elemental images are projected on the viewing screen 13 and due to the persistence of the vision, a sensation on the eye is created providing a composite picture from all the elemental images.

The anamorphic lenses 20 and 21 are merely illustrative and not limiting in their disclosure. A prismatic element or any suitable anamorphic system might be employed to accomplish this purpose of distorting the image to a line proximate the axis of the rotating mirror.

FIG. 2 illustrates the variable magnification optical system for each of the primary projectors. The barrel 30 is mounted on the outer periphery of the housing 31. The housing 31 threadingly engages the cap 32 which supports the objective lens 33. The opposite end of the housing 31 threadingly engages the end plate 34 having a central opening axially aligned with the optical axis. The lens 35 is supported in a housing 31 and is fixed relative to the objective lens 33. The housing 31 is formed with a cam slot 36 which receives the screw 37 which threadedly engages the movable lens mount 38. The lens 39 is movable axially in response to rotation of the barrel 30.

A second movable lens 40 is mounted within the lens mount 41. The lens mount 41 carries a screw 42 received within a cam groove 43 in the housing 31. The sleeve 44 is formed integral with the lens mount 38. The sleeve 44 is permitted to move axially within the recesses 45 formed in the housing 31. The lens mount 38 is connected to the sleeve 44 through the axially extending ribs 46 which are received within axial groove 47 in the movable lens mount 41.

As the barrel 30 is rotated by the ring gear 48 the movable lens mount 38 is also rotated by the engagement of the surfaces in the slot 49. The screw 37 biases the lens mount 38 in an axial direction due to the configuration of the cam slot 36. The ribs 46 cause the movable mount 41 to also rotate. The rotation of the lens mount 41 causes the lens mount to move axially due to the configuration of the groove 43 in the housing 31. The grooves 36 and 43 are of a predetermined shape to maintain the desired focusing and magnification of the lens assembly as the magnification is changed. This lens is merely illustrative and does not limit the disclosure. Any means of changing image size, such as moving lens and object in an appropriate manner, while maintaining the image at the rotating mirror will fulfill the requirements of the device.

Figure 8:
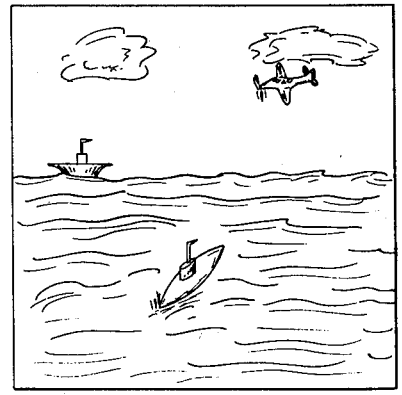
FIG. 8 illustrates the composite picture formed from the elemental images as illustrated in FIGS. 4, 5, 6 and 7.

Referring to FIGS. 4, 5, 6 and 7, the elemental images are disclosed which are simultaneously projected on the rotating mirror. The images received on the rotating mirror are sequentially projected through the secondary projector 22 to form the composite picture as illustrated in FIG. 8. The device will be described in the following paragraphs.

Referring to views 4, 5, 6 and 7, the images as illustrated are merely illustrative of elemental images which may be projected through the projector system. The projector 1 is centrally controlled through the table 12. The images are formed by a plurality of frames in a movie film of a predetermined object. The object may be rotated a predetermined number of degrees in each successive frame to simulate the turning of the object in the composite picture on the viewing screen. The object may be any single object or a plurality of objects in each projector to simulate a planned composite picture.

Figure 4:
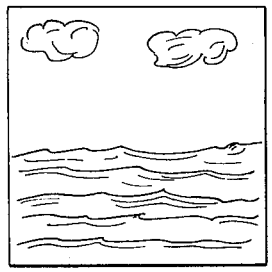
FIG. 4 is a background image projected from one of the primary projectors and forming the background on the viewing screen.
Figure 6:
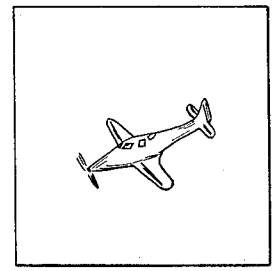
FIG. 6 is a second elemental image projected from a third of the projectors.
Figure 5:
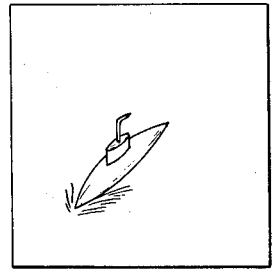
FIG. 5 is an elemental image projected from a second of the primary projectors.
Figure 7:
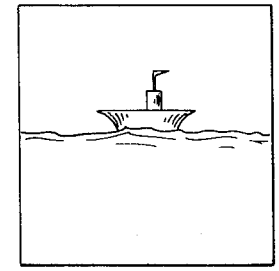
FIG. 7 is a third elemental image for projection from the fourth primary projector.

FIG. 4 illustrates the background scene which also may be varied to suit the particular purpose of the training film. Through the use of the central control system each of the objects may be rotated and shifted from one position to another on the viewing screen. The relative size of each of the objects may also be changed through the variable magnification in each of the plurality of the projectors. It can be seen that an almost unlimited number of objects could be impressed on the viewing screen. The movement of the objects could be controlled manually or programmed electrically to meet any desired training purpose.

The terrain on a map or the countryside as viewed from an airplane might also be simulated through the use of plurality projectors aligned as indicated. The system employs an anamorphic lens to make a clear picture with a greater area covered by each elemental image without defocusing in the final picture. The overall scene as illustrated in FIG. 4 might be projected to cover the entire viewing screen 13 through the anamorphic lens. The anamorphic lens could however be eliminated by using a monotone background lighting system for the background picture. The type of background is determined by the specific purpose required by a projection system.

The illustration and description covered in the specification is the preferred embodiment of the invention. Other embodiments might be devised which fall within the scope and the spirit of the invention. The following attached claims cover the invention as described.

I claim:
1. A projecting system comprising a plurality of projection means forming elemental images, a rotating mirror receiving and reflecting said plurality of elemental images, a secondary projecting means, an image receiving viewing means sequentially receiving said plurality of elemental images reflected from said mirror through said secondary projecting means to form a composite picture for visual observation.

2. A projecting system comprising, a rotating mirror, a plurality of image projecting means each having an anamorphic lens simultaneously projecting elemental images on said rotating mirror, an image receiving screen, a secondary projecting means having a compensating anamorphic lens intermediate said mirror and said screen, said rotating mirror sequentially projecting the images formed on said mirror through said secondary projecting means on said image receiving screen to provide a composite picture of said plurality of elemental images formed on said rotating mirror.

3. The method of producing a composite image comprising simultaneously projecting a plurality of elemental images on a pivotally supported mirror, sequentially reflecting the images formed on the mirror in a common direction, sequentially projecting the images on a viewing screen to form a composite picture from said elemental images for visual observation.

4. The method of forming a composite viewing picture comprising simultaneously projecting and converging a plurality of elemental images proximate of the axis of rotation of an image receiving mirror, sequentially reflecting the images formed on said mirror in a common direction, sequentially diverging and projecting said elemental images to a point of visual observation thereby producing a composite picture.

5. The method of forming a composite viewing picture comprising aligning a plurality of optical centers of a plurality of projectors normally with the axis of rotation of a rotating mirror, simultaneously projecting a plurality of elemental images on the axis of rotation of the image receiving mirror, sequentially reflecting the mirror images through a secondary projecting means, sequentially projecting the images on a viewing screen to form a composite picture from the elemental images for visual observation.

6. The method of forming a composite viewing picture comprising, aligning the optical centers of a plurality of projectors normally with the axis of rotation of a rotating reflector, simultaneously projecting a plurality of elemental image components on the axis of rotation of the reflector, sequentially reflecting the reflector image components through a projector means on a viewing screen to form a composite picture from said elemental image components, simultaneously controlling the virtual position of said plurality of elemental image components and controlling the relative location of said image components to simulate movement of said elemental components in said composite picture.

References Cited by the Examiner
UNITED STATES PATENTS

| 540,545 | 6/95 | Gray | 88—16.6 |
| 2,013,350 | 9/35 | Leventhal | 88—16.6 |
| 2,198,815 | 4/40 | Haskin | 88—16.6 |
| 2,252,726 | 8/41 | Peck | 35—35.2 |
| 2,334,962 | 11/43 | Seitz | 88—19.5 |

NORTON ANSHER, *Primary Examiner.*

EMIL G. ANDERSON, *Examiner.*